United States Patent
Hayashi

(10) Patent No.: US 7,801,360 B2
(45) Date of Patent: Sep. 21, 2010

(54) TARGET-IMAGE SEARCH APPARATUS, DIGITAL CAMERA AND METHODS OF CONTROLLING SAME

(75) Inventor: Daisuke Hayashi, Asaka (JP)

(73) Assignee: Fujifilm Corporation, Tokyo (JP)

( * ) Notice: Subject to any disclaimer, the term of this patent is extended or adjusted under 35 U.S.C. 154(b) by 953 days.

(21) Appl. No.: 11/580,829

(22) Filed: Oct. 16, 2006

(65) Prior Publication Data

US 2007/0086648 A1  Apr. 19, 2007

(30) Foreign Application Priority Data

Oct. 17, 2005  (JP) ............................. 2005-301133

(51) Int. Cl.
  *G06K 9/46*  (2006.01)
(52) U.S. Cl. .................. 382/190; 382/291; 382/100
(58) Field of Classification Search ................ 382/100, 382/115, 117, 118, 128, 151, 181, 190, 195, 382/224; 351/204; 128/920
  See application file for complete search history.

(56) References Cited

U.S. PATENT DOCUMENTS

| | | | | |
|---|---|---|---|---|
| 6,128,397 | A * | 10/2000 | Baluja et al. | 382/118 |
| 6,181,805 | B1 * | 1/2001 | Koike et al. | 382/118 |
| 7,327,886 | B2 | 2/2008 | Ito | |
| 2001/0053292 | A1 * | 12/2001 | Nakamura | 396/661 |
| 2003/0179933 | A1 * | 9/2003 | Kato et al. | 382/190 |
| 2004/0080661 | A1 * | 4/2004 | Afsenius et al. | 348/345 |
| 2004/0151350 | A1 * | 8/2004 | Tafuku et al. | 382/116 |
| 2004/0263621 | A1 * | 12/2004 | Guo et al. | 348/143 |
| 2005/0100195 | A1 * | 5/2005 | Li | 382/118 |
| 2005/0200736 | A1 | 9/2005 | Ito | |
| 2006/0045317 | A1 * | 3/2006 | Adachi et al. | 382/118 |
| 2006/0120571 | A1 * | 6/2006 | Tu et al. | 382/118 |
| 2006/0279640 | A1 * | 12/2006 | Matsuzaka et al. | 348/222.1 |
| 2007/0211918 | A1 * | 9/2007 | Kawada | 382/103 |
| 2008/0137918 | A1 * | 6/2008 | Eura et al. | 382/118 |
| 2008/0253664 | A1 * | 10/2008 | Li et al. | 382/226 |
| 2009/0238549 | A1 * | 9/2009 | Kanayama | 396/95 |

FOREIGN PATENT DOCUMENTS

| | | |
|---|---|---|
| JP | 4-205070 A | 7/1992 |
| JP | 11-15979 A | 1/1999 |
| JP | 2002-216129 A | 8/2002 |
| JP | 2004-252627 | 9/2004 |
| JP | 2005-210288 A | 8/2005 |
| JP | 2005-267512 A | 9/2005 |
| JP | 2007-74394 | 3/2007 |

\* cited by examiner

*Primary Examiner*—Andrew W Johns
*Assistant Examiner*—Tahmina Ansari
(74) *Attorney, Agent, or Firm*—Birch, Stewart, Kolasch & Birch, LLP

(57) ABSTRACT

The time required to execute processing for detecting the image of a face is shortened. A number of frames of the image of a subject are obtained sequentially by sensing the image of the subject successively. Face detection processing is applied to a first subject image, which is one frame of the image of the subject among the number of frames thereof. The inclination of a face-image area obtained by detection is detected. Among angles of 0°, 90°, 180° and 270°, that close to the detected inclination is decided upon. A face image having an angle within a range of 45° on either side of the decided angle as its inclination is detected from a second subject image, which is obtained following the first subject image. Since face images to undergo detection are thus restricted, detection processing ends in a comparatively short period of time.

4 Claims, 13 Drawing Sheets

LEFT-ORIENTED
FACE IMAGE

FRONT-ORIENTED
FACE IMAGE

RIGHT-ORIENTED
FACE IMAGE

TARGET-IMAGE SEARCH APPARATUS, DIGITAL CAMERA AND METHODS OF CONTROLLING SAME

BACKGROUND OF THE INVENTION

1. Field of the Invention

This invention relates to a target-image search apparatus, a digital camera and methods of controlling the apparatus and camera.

2. Description of the Related Art

If the subject of photography is a person, there are instances where signal processing such as color correction and contour enhancement is executed in such a manner that the image of the face in the captured image of the person will appear in attractive fashion. In order to execute signal processing, it is necessary to detect a target image, such as the portion of the image that is the face. In a case where the target-image portion is detected from frames of the image of the subject that form a moving picture obtained by sensing the image of the subject successively at a fixed period, real-time processing is required. This makes rapid detection necessary.

In order to achieve this, the specification of Japanese Patent Application Laid-Open No. 4-205070 proposes previously storing an area, from within the image of a subject, in which a specific target image is displayed, and detecting the target image from an image obtained from an area larger than this area, and the specification of Japanese Patent Application Laid-Open No. 11-15979 proposes extracting a so-called skin-tone area and a dark area from a color image and detecting a face image, which is the target image, based upon information concerning the areas extracted.

However, there is still room for improvement.

SUMMARY OF THE INVENTION

Accordingly, an object of the present invention is to detect a target image rapidly.

According to a first aspect of the present invention, the foregoing object is attained by providing a target-image search apparatus comprising: a first target-image detecting device for detecting a target image from a first subject image among a plurality of frames of subject images obtained by sensing the image of a subject successively; a detection-angle deciding device for deciding a detection angle of the target image based upon a relative angle of rotation between the target image detected by the first target-image detecting device and the first subject image; and a second target-image detecting device for detecting the target image, which has an angle based upon the detection angle decided by the detection-angle deciding device, from a second subject image different from the first subject image among the plurality of frames of subject images.

The first aspect of the present invention also provides a control method suited to the above-described target-image search apparatus. Specifically, there is provided a method of controlling a target-image search apparatus comprising the steps of: detecting a target image from a first subject image among a plurality of frames of subject images obtained by sensing the image of a subject successively; deciding a detection angle of the target image based upon a relative angle of rotation between the target image detected and the first subject image; and detecting the target image, which has an angle based upon the detection angle decided, from a second subject image different from the first subject image among the plurality of frames of subject images.

In accordance with the first aspect of the present invention, a plurality of frames of subject images are obtained by sensing the image of a subject successively. A target image is detected from a first subject image among the plurality of frames of subject images. A detection angle of the target image is decided based upon the relative angle of rotation between the target image detected and the first subject image. The target image, which has an angle based upon the detection angle decided (the angle may be the detection angle or an angle in the vicinity of the detection angle), is detected from a second subject image. Processing for detecting the target image, which has an angle based upon the detection angle, from the second subject image is executed, but processing for detecting a target image having an angle other than the angle based upon the detection is not executed. As a result, the time required for detection processing is shortened.

Sensing the image of a subject refers to image sensing in a prescribed sequence, such as image sensing by successive shooting, movie image sensing and so-called preliminary image sensing performed prior to the pressing of a shutter-release button in an image sensing mode of a digital still camera.

By way of example, the detection-angle deciding device decides the target image, which has been detected by the first target-image detecting device, from n-number of detection angles defined every other 360/n (where n is an integer equal to or greater than 2) degrees based upon the relative angle of rotation between the target image and the first subject image.

By way of example, the second target-image detecting device detects the target image, which has an angle within a range of 360/n degrees centered on the detection angle decided by the detection-angle deciding device, from the second subject image.

According to a second aspect of the present invention, the foregoing object is attained by providing a target-image search apparatus comprising: a first target-image detecting device for detecting a target image from a first subject image among a plurality of frames of subject images obtained by sensing the image of a subject successively; an orientation deciding device for deciding an orientation in which the target image is to be detected, based upon orientation of the target image detected by the first target-image detecting device; and a second target-image detecting device for detecting the target image, which has an orientation decided by the orientation deciding device, from a second subject image different from the first subject image among the plurality of frames of subject images.

The second aspect of the present invention also provides a control method suited to the above-described target-image search apparatus. Specifically, there is provided a method of controlling a target-image search apparatus comprising the steps of: detecting a target image from a first subject image among a plurality of frames of subject images obtained by sensing the image of a subject successively; deciding an orientation in which the target image is to be detected, based upon orientation of the target image detected; and detecting the target image, which has a decided orientation, from a second subject image different from the first subject image among the plurality of frames of subject images.

In the second aspect of the present invention as well, a plurality of frames of subject images are obtained by sensing the image of a subject successively. A target image is detected from a first subject image among the plurality of frames of subject images obtained. The orientation of the target image to be detected is decided in a second subject image based upon the orientation of the detected target image. A target image having the orientation decided is detected from the second subject image. Since the target image having the orientation decided becomes the object of detection of the second subject image, target images that become the object of detection are reduced. A target image can be detected from the second subject image comparatively quickly. By way of an example, if the target image is the image of a face, the orientation of the target image refers to an angle of rotation about a vertical line, such as the image of a face oriented sideways or the image of face oriented forward.

According to a third aspect of the present invention, the foregoing object is attained by providing a target-image search apparatus comprising: a first target-image detecting device for detecting a plurality of target images from a first subject image among a plurality of frames of subject images obtained by sensing the image of a subject successively; a coordinate detecting device for detecting a minimum value and a maximum value of each of X-coordinate positions and Y-coordinate positions of the plurality of target images detected by the first target-image detecting device; and a second target-image detecting device for detecting the target images in an area decided based upon the minimum values and maximum values detected by the coordinate detecting device, in a second subject image different from the first subject image among the plurality of frames of subject images.

The third aspect of the present invention also provides a control method suited to the above-described target-image search apparatus. Specifically, there is provided a method of controlling a target-image search apparatus comprising the steps of: detecting a plurality of target images from a first subject image among a plurality of frames of subject images obtained by sensing the image of a subject successively; detecting a minimum value and a maximum value of each of X-coordinate positions and Y-coordinate positions of the plurality of target images detected; and detecting the target images in an area decided based upon the minimum value and maximum value detected, in a second subject image different from the first subject image among the plurality of frames of subject images.

In accordance with the third aspect of the present invention as well, a plurality of frames of subject images are obtained by sensing the image of a subject successively. A plurality of target images of the same type are detected from a first target image among a plurality of frames of subject images obtained. A minimum value and a maximum value of X-coordinate positions and Y-coordinate positions of the detected plurality of target images are detected. Target images are detected in an area decided based upon the detected minimum value and maximum value of X-coordinate positions and Y-coordinate positions in the second subject image. Since the area in which a target image is to be detected is restricted in the second subject image, the time needed for processing to detect a target image is shortened.

According to a fourth aspect of the present invention, the foregoing object is attained by providing a digital camera having an image sensing apparatus for sensing the image of a subject and outputting image data representing the image of the subject, comprising: an inclination sensor for detecting inclination of the digital camera; a detection-area deciding device for deciding a detection area of a target image based upon the inclination detected by the inclination sensor; and a target-image detecting device for detecting the target image in the detection area, which has been decided by the detection-area deciding device, in the image of the subject represented by the image data that has been output from the image sensing apparatus.

The fourth aspect of the present invention also provides a control method suited to the above-described digital camera. Specifically, there is provided a method of controlling a digital camera comprising the steps of: detecting inclination of the digital camera; deciding a detection area of a target image based upon the inclination detected; and detecting the target image in the decided detection area in the image of the subject represented by the image data that has been output from the image sensing apparatus.

In accordance with the fourth aspect of the present invention, the inclination of a digital still camera is detected and a detection area of a target image is decided based upon the inclination detected. Processing for detecting the target image in the decided detection area is executed. Since the detection area of the target image is restricted, detection processing can be executed comparatively quickly. For example, if the target image is the image of a face and, moreover, a person serving as the subject is imaged with the camera being held in the upright attitude, then the face often will be situated at the upper part of the imaging zone and therefore the upper part of the imaging zone would be decided upon as the detection area.

If the target image is the image of a face, then the detection-area deciding device may decide that an area having a center of gravity at the upper part of the image of the subject is the detection area of the target image, or may decide that a rectangular area in which distance to a lower edge of the subject image is greater than distance to an upper edge of the subject image is the detection area of the target image.

According to a fifth aspect of the present invention, the foregoing object is attained by providing a digital camera having an image sensing apparatus for sensing the image of a subject and outputting image data representing the image of the subject, comprising: a sensor for detecting upward direction of the image of the subject; and a target-image detecting device for detecting a target image whose inclination angle about a vertical center line falls within a range of prescribed angles of rotation in which the upward direction detected by said sensor serves as a reference.

The fifth aspect of the present invention also provides a control method suited to the above-described digital camera. Specifically, there is provided a method of controlling a digital camera comprising the steps of: detecting upward direction of the image of the subject; and detecting a target image whose inclination angle about a vertical center line falls within a range of prescribed angles of rotation in which the detected upward direction serves as a reference.

In accordance with the fifth aspect of the present invention, the upward direction of the image of a subject is detected. This is followed by detecting a target image whose inclination angle about a vertical center line falls within a range of prescribed angles of rotation, the upward direction detected serving as a reference. Since a target image whose inclination angle about a vertical center line does not fall within a range of prescribed angle is excluded from detection, the number of target images to be detected is reduced. The time needed for processing to detect target images can therefore be shortened.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Preferred embodiments of the present invention will now be described with reference to the drawings.

Figure 1:
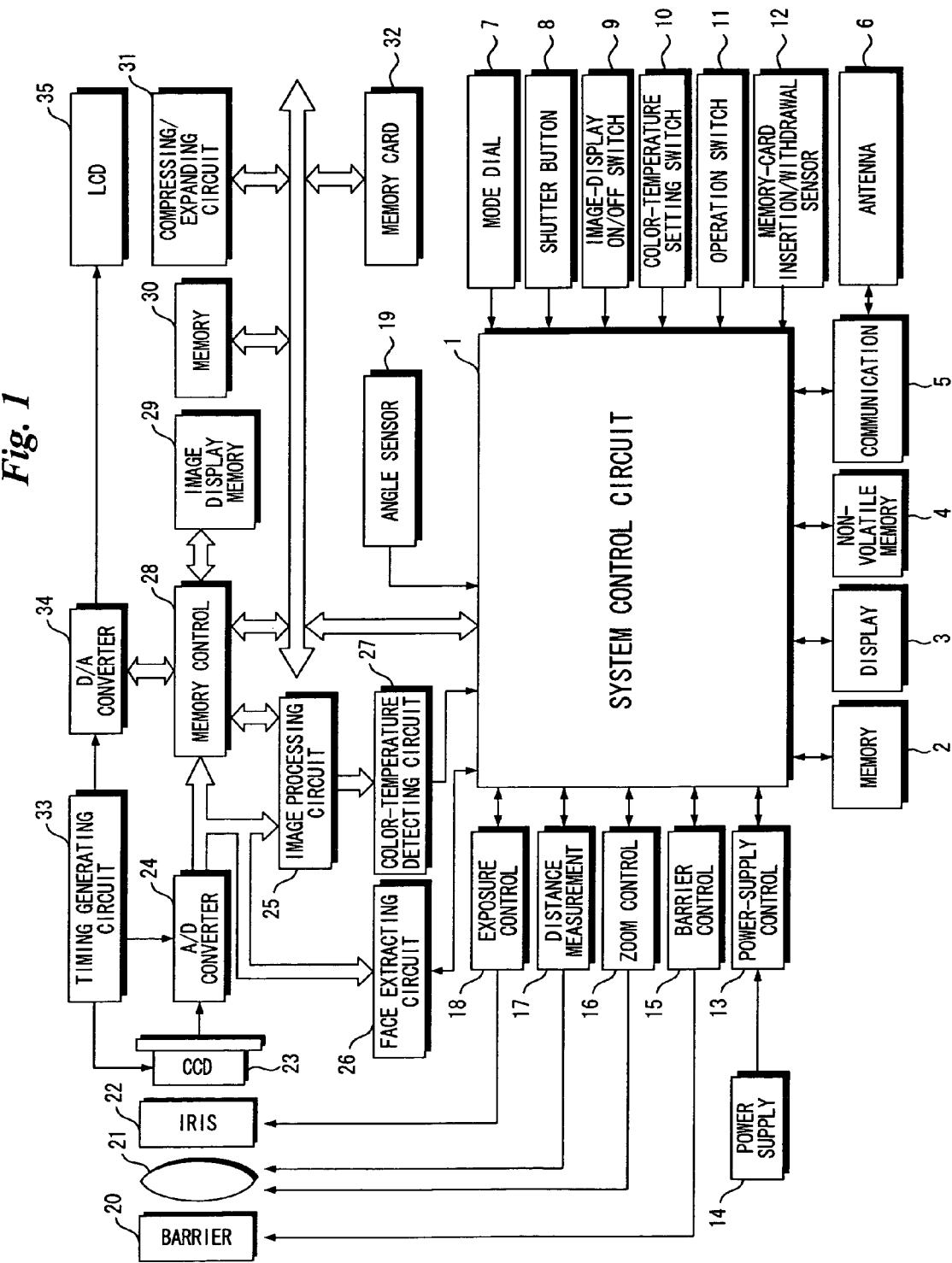
FIG. 1 is a block diagram illustrating the electrical structure of a digital still camera.

FIG. 1 is a block diagram illustrating the electrical structure of a digital still camera according to a preferred embodiment of the present invention.

The overall operation of the digital still camera is controlled by a system control circuit 1.

The digital still camera is provided with a mode dial 7 for setting modes such as an image sensing mode and playback mode, a shutter-release button 8, an image-display on/off switch 9 for controlling on/off operation of a liquid crystal display device 35, a color-temperature setting switch 10, an operation switch 11, and a circuit 12 for sensing insertion and withdrawal of a memory card. Signals that have been output from these switches are input to the system control circuit 1. Connected to the system control circuit 1 are a memory 2 for storing data and the like temporarily, a display unit 3 for displaying prescribed information such as a frame number, a non-volatile memory 4 and a communication circuit 5. An antenna 6 is connected to the communication circuit 5. The system control circuit 1 further includes a power-supply control circuit 13. This circuit provides each circuit with power supplied from a power supply 14.

The digital still camera is provided with an angle sensor 19. By way of example, the angle sensor 19 contains an internal plumb bob and the relative angle between the plumb bob and camera changes in dependence upon the inclination of the camera. The angle sensor 19 further incorporates a light sensor by which the relative angle is detected, thereby detected the inclination of the camera. It may of course be so arranged that camera inclination is detected using another type of angle sensor. Further, it will be understood that the orientation of the subject image sensed by the camera can be ascertained by determining the camera inclination.

The digital still camera includes a CCD 23 controlled by a timing generating circuit 33. Provided in front of the CCD 23 are a barrier 20 open and closed under the control of a barrier control circuit 15; a zoom lens 21, which is positioned at an in-focus position and whose amount of zoom is controlled by a zoom control circuit 16; and an iris 22 whose f-stop value is controlled by an exposure control circuit 18.

If the image sensing mode is set, the image of a subject is sensed at a fixed period and a video signal representing the image of the subject is output from the CCD 23 at the fixed period. The video signal that has been output from the CCD 23 is applied to an analog/digital converting circuit 24, which converts the signal to digital image data. The image data obtained by the conversion is applied to a face extracting circuit 26. As will be described later, the face extracting circuit 26 extracts a face image from the image of a subject obtained by image sensing. Processing for extracting the face will be described later in detail. The image data obtained by the conversion is applied also to an image processing circuit 25, which proceeds to execute prescribed image processing such as a gamma correction. Image data that has been output from the image processing circuit 25 is input to a color-temperature detecting circuit 27. The latter detects the color temperature of the subject image and applies a color balance adjustment under the control of the system control circuit 1.

The image data that has been output from the analog/digital converting circuit 24 is stored temporarily in an image display memory 29 by control exercised by a memory control circuit 28. The image data is read out of the image display memory 29 and applied to a digital/analog converting circuit 34, whereby the image data is returned to an analog video signal. The analog video signal is applied to the liquid crystal display device 35, whereby the image of the subject obtained by image sensing is displayed on the display screen of the liquid crystal display device 35.

If the shutter-release button 8 is pressed, image data that has been output from the analog/digital converting circuit 24 is stored temporarily in a memory 30 by the memory control circuit 28 in the manner described above. The image data is read out of the memory 30 and compressed in a compressing/expanding circuit 31. The compressed image data is applied to and recorded on a memory card 32.

If the playback mode is set, compressed image data that has been recorded on the memory card 32 is read out and is expanded by the compressing/expanding circuit 31. The expanded image data is converted to a video signal and applied to the liquid crystal display device 35, where the image of the subject represented by the image data that has been read out of the memory card 32 is displayed on the display screen of the liquid crystal display device 35.

Figure 2:
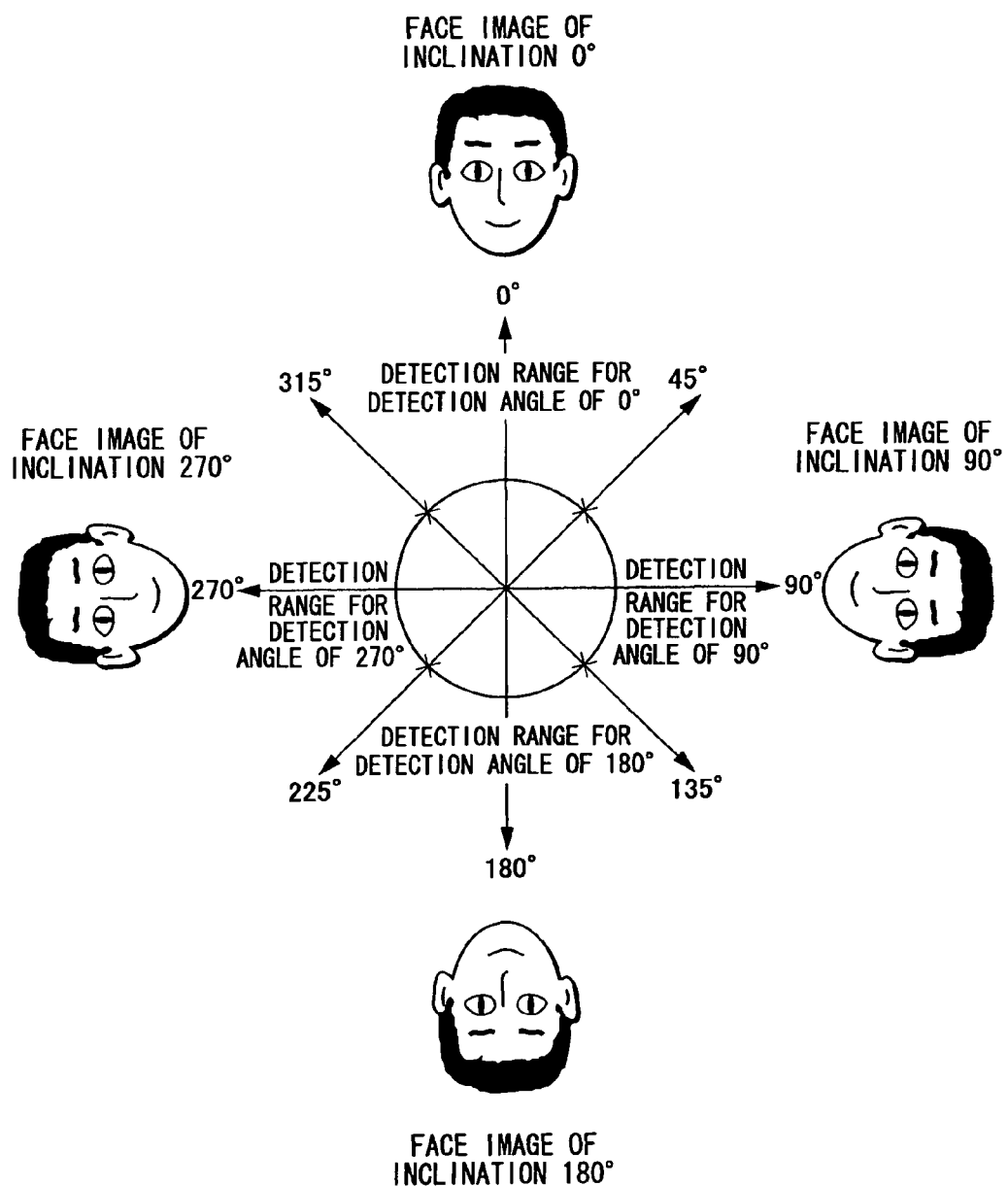
FIG. 2 illustrates the relationship between detected face images and ranges of detection thereof according to a first embodiment.

FIG. 2 illustrates the relationship between detected face images and ranges of detection.

If the image sensing mode is set as described above in the digital still camera according to this embodiment, preliminary image sensing in which the image of the subject is sensed at a fixed period until the shutter-release button 8 is pressed is carried out. A number of frames of images of the subject are obtained at the fixed period by this preliminary image sensing operation. Processing for detecting a face image is executed in a first subject image, which is one frame of the number of frames of the image of the subject. Face images of various inclinations can be detected in such face-image detection processing. This processing can also be realized by, e.g., stipulating an area having a prescribed size, causing this area to scan across the first subject image and calculating an evaluation value, which indicates how face-like the image is, by taking into account the constituent pixels and color, etc., of the face in the image within the area. It can also be realized by calculating the degree of agreement between a number of face images and samples of face images having a variety of inclinations.

In this embodiment, a detection range in the image of a subject (a second subject image) other than a first image of the subject is decided in accordance with the inclination of a face image detected in the first image of the subject (the inclination is a relative angle of rotation between the first subject image and the detected face image). Whichever angle from among 0°, 90°, 180° and 270° is close to the inclination of a face image detected in the first subject image is decided upon as a detection angle. A range of 45° on either side of the decided angle becomes a face-image detection range in the second subject image. For example, in a case where inclinations of a face image detected in the first subject image are 315° to 45°, 45° to 135°, 135° to 225° and 225° to 315°, the detection angles are 0°, 90°, 180° and 270°, respectively. In the second subject image, face-image inclinations of 315° to 45°, 45° to 135°, 135° to 225° and 225° to 315° become the object of detection. Since subject images to be detected in the second subject are reduced, the time required for detection processing is shortened.

Figure 3:
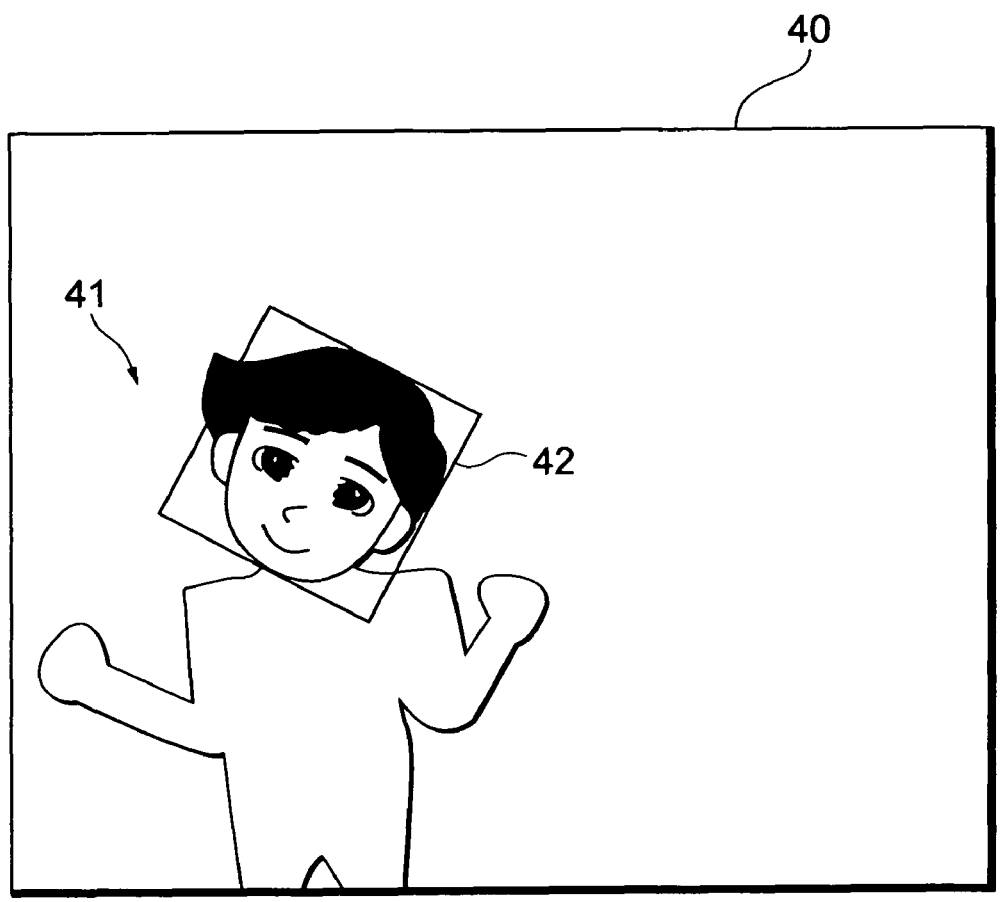
FIG. 3 illustrates an example of the image of a subject according to the first embodiment.

FIG. 3 illustrates an example of a first image 40 of the subject.

The first subject image 40 contains the image 41 of a person. A face image 42 is found by applying face detection processing to the first subject image 40. The inclination of the face image 42 found is detected. Assume that the inclination detected is 30°, by way of example. In such case the detection angle is 0° and, in the second subject image, face images having an inclination of from 315° to 45° become the object of detection.

Figure 4:
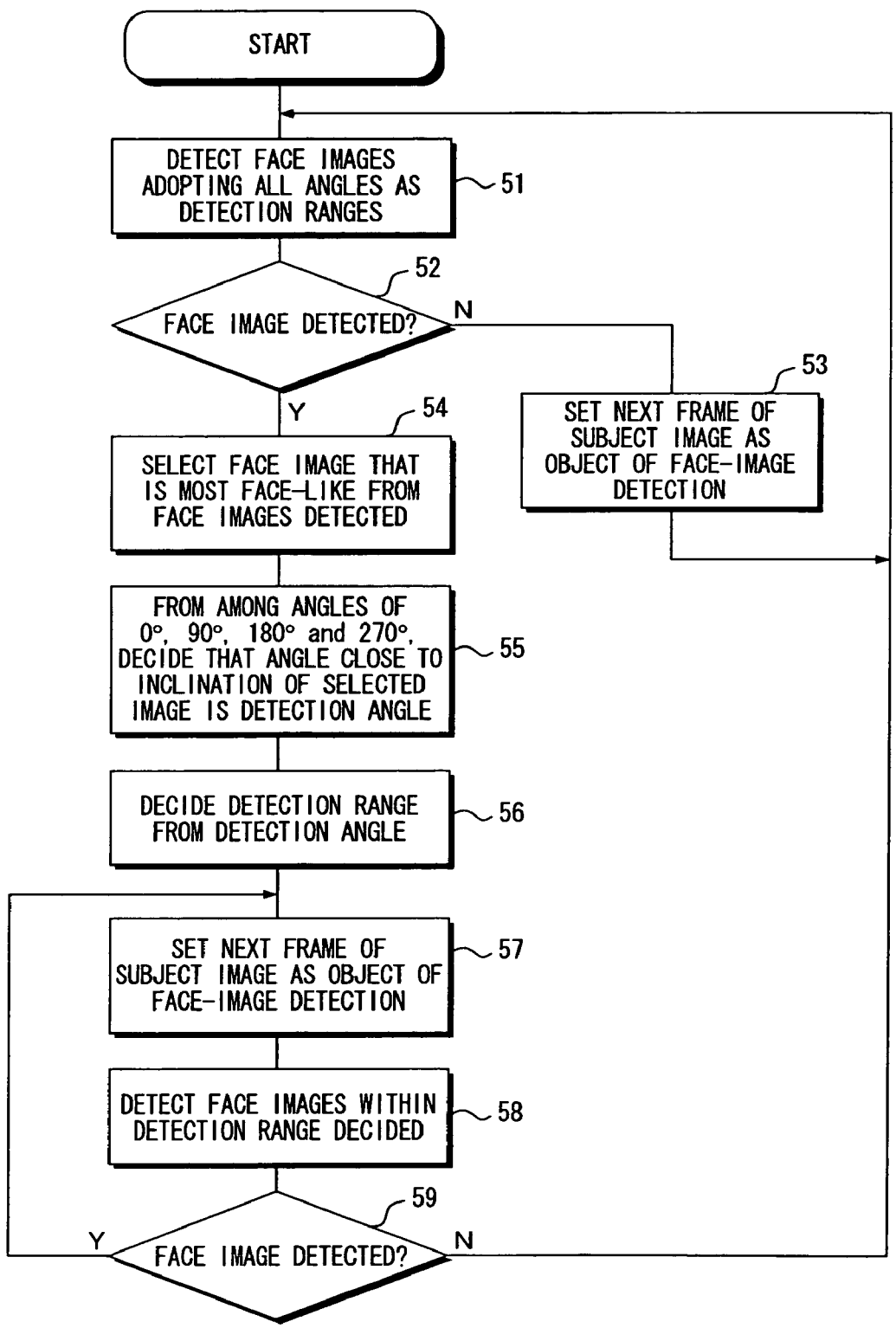
FIG. 4 is a flowchart illustrating processing for detecting a face image according to the first embodiment.

FIG. 4 is a flowchart illustrating processing for detecting a face image.

Processing for detecting face images in which all angles are detection ranges is executed in a prescribed first subject image among subject images obtained in succession (step 51). That is, face-image detection processing is executed so as to detect face images having any inclinations whatsoever. If a face image is not detected from the first subject image ("NO" at step 52), then the next frame of the subject image is set as the object of face-image detection (step 53). The next frame of the subject image becomes the first subject image and face-image detection processing is executed again with all angles serving as detection ranges.

If face images are detected from the first subject image ("YES" at step 52), the face image that is most face-like is selected from among the face images detected (step 54). This selection may be made by displaying the first subject image on the display screen of the liquid crystal display device 35 and having the user make the selection, or it may be so arranged that in a case where an evaluation value of facial likeliness of the image is obtained, the selection is decided based upon the evaluation value. It goes without saying that it may be so arranged that even if a face image that is most face-like is not selected, a face image may be selected based upon the largest or brightest face image or some other factor.

Next, the angle from among 0°, 90°, 180° and 270° that is near the inclination of the selected face image is decided upon as the detection angle (step 55), as described above. A detection range indicating inclination of a face image to be detected in the second subject image is decided as described above from the detection angle that has been decided (step 56). The next frame of the subject image (the second subject image) is set as the object of face-image detection (step 57) and face images having an inclination within the detection range decided are detected in the second subject image (step 58).

If a face image is detected ("YES" at step 59), the next frame of the subject image is set as the object of face-image detection (step 57). Since it is construed that the face of the subject has not moved that much, face-image detection processing is executed again within the detection range that has been decided (step 58). If a face image is not detected ("NO" at step 59), it is construed that the face of the subject has moved and therefore face-image detection processing is executed again with all angles serving as detection ranges (step 51).

FIGS. 5A, 5B, 5C and FIG. 6 illustrate a second embodiment of the present invention.

The orientation of a face image is utilized in this embodiment. Face images of all orientations are detected in a first subject image among a plurality of frames of a subject image applied in succession. Then, in a second subject image, face images having orientations close to the orientations of face images detected in the first subject image become the object of detection.

Figure 5A:
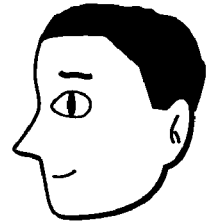
FIGS. 5A to 5C illustrate examples of face images according to a second embodiment.

FIG. 5A is an example of a face image that is oriented to the left. If a left-oriented face image is detected in face detection processing applied to the first subject image, then face images oriented to the left become face images that are the object of detection in the second subject image.

Figure 5B:

FIG. 5B is an example of a face image that is oriented toward the front. If a face image oriented toward the front is detected in face detection processing applied to the first subject image, then face images oriented substantially toward the front become face images that are the object of detection in the second subject image.

Figure 5C:
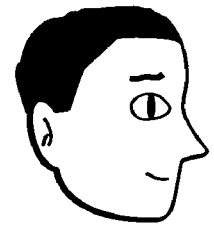

FIG. 5C is an example of a face image that is oriented to the right. If a right-oriented face image is detected in face detection processing applied to the first subject image, then face images oriented to the right become face images that are the object of detection in the second subject image.

Figure 6:
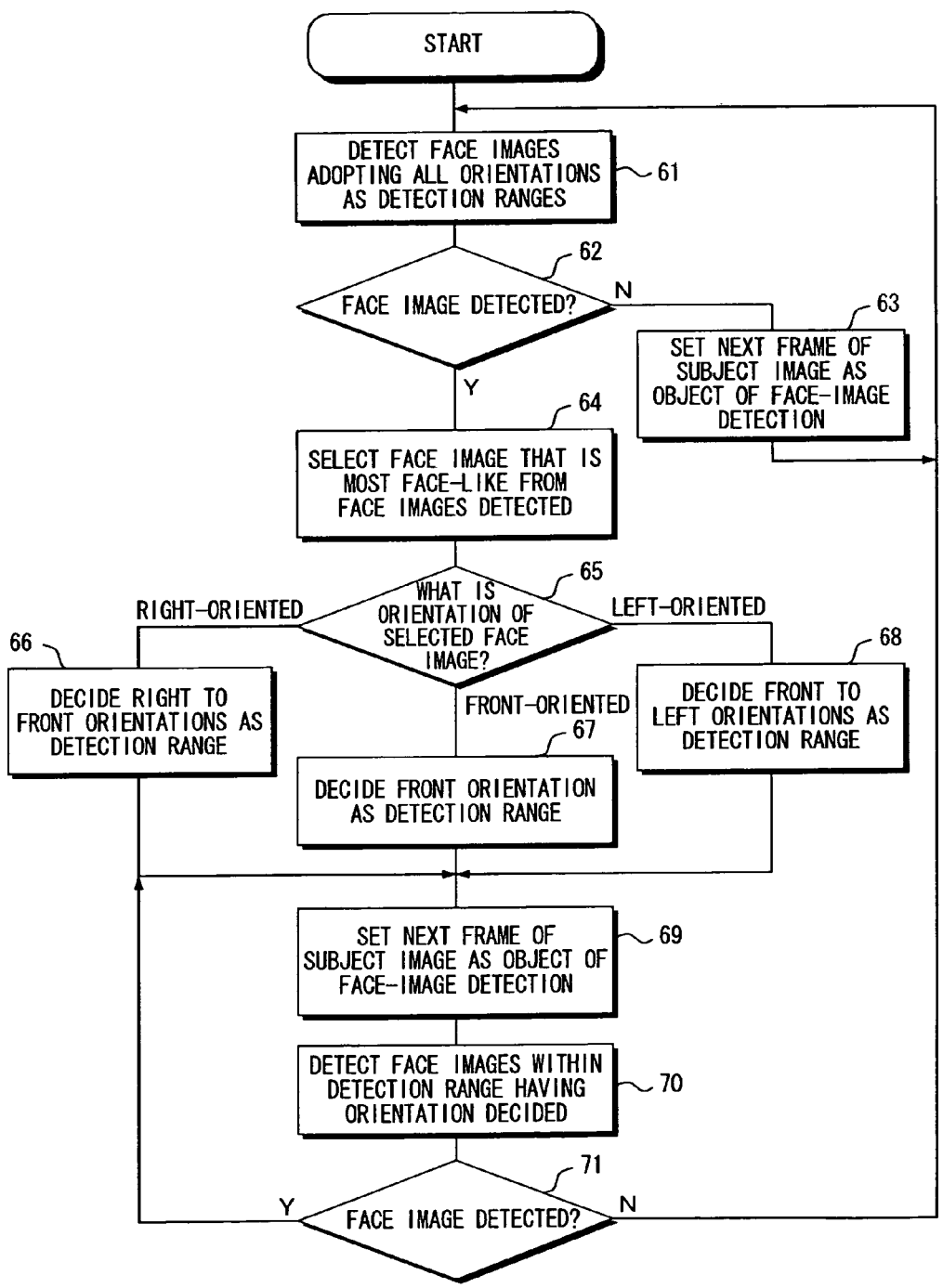
FIG. 6 is a flowchart illustrating processing for detecting a face image according to the second embodiment.

FIG. 6 is a flowchart illustrating processing for detecting a face image.

In this processing also, as described above, it is assumed that the image of a subject is sensed successively and that a number of frames of the image of the subject are obtained. Face-image detection processing is executed in the first subject image among the plurality of frames of the image of the subject in such a manner that face images having all orientations are detected (step 61). If a face image is not detected ("NO" at step 62), then the next frame of the subject image is set as the object of face-image detection (step 63).

If face images are detected ("YES" at step 62), the face image that is most face-like is selected from among the face images detected (step 64). The orientation of the selected face image is judged (step 65). If the face image is oriented to the right, then a detection range is decided so as to detect right- to front-oriented face images (step 66). If the face image is oriented to the front, then a detection range is decided so as to detect substantially front-oriented face images (step 67). If the face image is oriented to the left, then a detection range is decided so as to detect front- to left-oriented face images (step 68). The orientation of the selected face image need not be that stringent. If face images are considered to be substantially left-oriented, substantially front-oriented and substantially right-oriented, then the face images can be decided upon as being left-oriented, front-oriented and right-oriented, respectively.

The next frame of the subject image is set as the object of face-image detection (step 69) and face-image detection processing is executed so as to detect face images having the orientation decided (step 70). If a face image is detected ("YES" at step 71), it is construed that there has not been much change in the orientation of the face and therefore processing is repeated for continuing to detect subject images having orientations within the detection range decided (steps

69, 70). If a face image is not detected ("NO" at step 71), it is construed that the face of the subject has moved and therefore face-image detection processing is executed again with all orientations serving as detection ranges (step 61).

Since face images having a prescribed orientation become the object of detection in the second subject image or in subject images from the second subject image onward, face images to undergo detection become fewer and the time needed for face-image detection processing is shortened.

Figure 7:
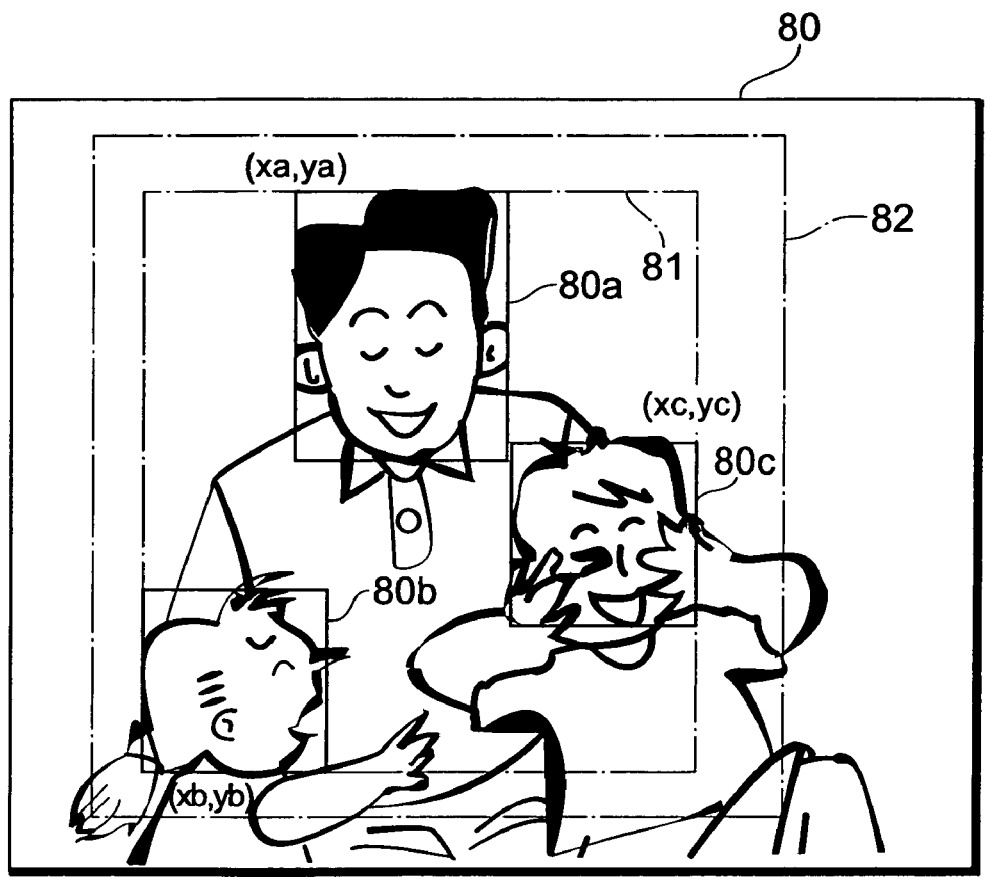
FIG. 7 illustrates an example of the image of a subject according to a third embodiment.
Figure 8:
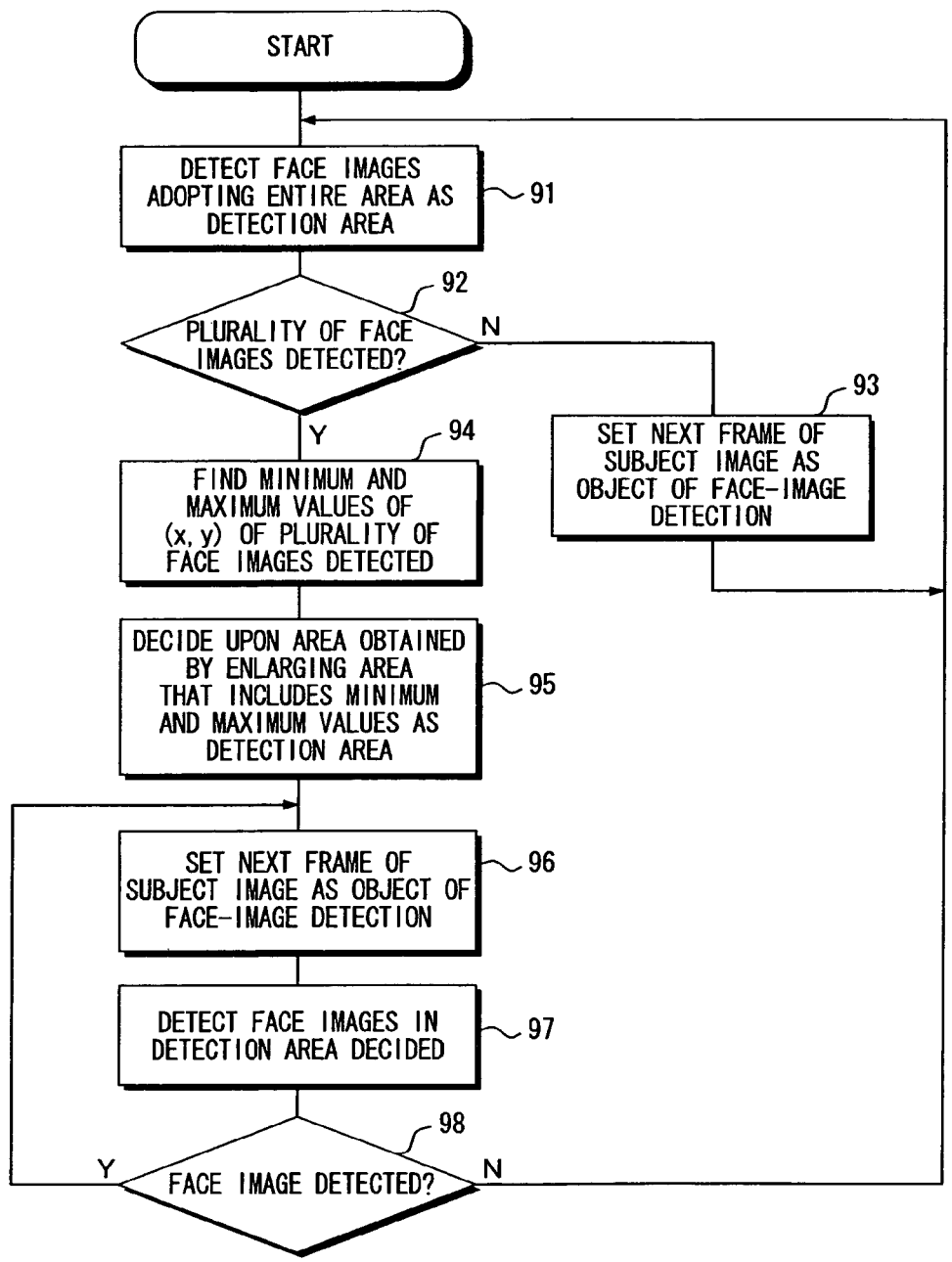
FIG. 8 is a flowchart illustrating processing for detecting a face image according to the third embodiment.

FIGS. 7 and 8 illustrate a third embodiment of the present invention. A number of frames of the image of a subject are obtained by sensing the image of the subject successively in this embodiment as well. A plurality of face images are detected from within a first subject image constituting the number of frames of the image of the subject. An area larger than an area that encloses the detected plurality of face images is stipulated and this large area is adopted as a face-image detection area that stipulates an area in which face images are to be detected in a second subject image.

FIG. 7 illustrates an example of a first subject image 80.

By executing face-image detection processing in the first subject image 80, a first face-image 80*a*, second face-image area 80*b* and a third face-image area 80*c*, all of which are rectangular, are detected. The first face-image 80*a* is located at the upper part of the first subject image 80, the second face-image area 80*b* is located at the lower left of the first subject image 80, and the third face-image area 80*c* is located slightly to the right of the center of the first subject image 80. If we let (xa,ya) represent the coordinates of the upper-left corner of the first face-image 80*a*, (xb,yb) the coordinates of the lower-left corner of the second face-image area 80*b* and (xc,yc) the coordinates of the upper-right corner of the third face-image area 80*c*, then an area 81 that encloses all of the first, second and third first face-images 80*a*, 80*b*, 80*c*, respectively, will be defined by the coordinates (xb,ya), (xc,ya), (xb,yb) and (xc,yb). An area 82 obtained by enlarging the area 81 thus stipulated thus defined is stipulated and the enlarged area 82 becomes a face-image detection area in the second subject image. Since the detection area is smaller than the second subject image, prompt face detection processing can be implemented.

If we let ha represent the height of the first face-image 80*a*, hb the height and wb the width of the second face-image area 80*b* and wc the width of the third face-image area 80*c*, then the area 82 is obtained by enlarging the area 81 by ha/2 in the upward direction, hb/2 in the leftward direction, hb/2 in the downward direction and wc/2 in the rightward direction, by way of example.

FIG. 8 is a flowchart illustrating processing for detecting a face image.

As described above, the image of a subject is sensed successively and a number of frames of the image of the subject are obtained. Face-image detection processing is executed in the first subject image with the entire area of the first subject image being adopted as the detection area (step 91). If a plurality of face images are not detected in the first subject image ("NO" at step 92), then the next frame of the subject image is adopted as the first subject image and is set as the object of face-image detection (step 93). The entire area of the next frame of the first subject image is adopted as the detection area and face-image detection processing is executed again.

If a plurality of face images are detected ("YES" at step 92), then a minimum value and maximum value of each of the x and y coordinates stipulating the area of the plurality of face images detected as described above are found (step 94). An area obtained by enlarging the area that is stipulated by the minimum and maximum values found is decided upon an area in which face images are to be detected (step 95). The next frame of the subject image (the second subject image) is set as the object of face-image detection (step 96) and face-image detection processing is executed with regard to the image within the area decided (step 97). Since an area smaller than the entirety of the image of the subject and not the entire image of the subject is adopted as the area in which face images are to be detected, the time required for detection processing is shortened.

If face images are detected in the image within the area decided ("YES" at step 98), then it is construed that the image of the subject has not moved that much. Accordingly, the area of face-image detection is kept as the area decided, the next frame of the image of the subject is set as the target of face-image detection (step 96) and face-image detection processing is executed. If a face image is not detected in the image within the area decided ("NO" at step 98), then face-image detection processing in which the entire area is adopted as the detection area is executed (step 91).

The determination as to whether a face image is contained in the area decided (step 98) may be a determination as to whether a plurality of face images are contained in the area or a determination as to whether one face image is contained in the area.

FIGS. 9A, 9B to FIG. 12 illustrate a fourth embodiment of the invention.

In this embodiment, camera inclination is detected and the upper and lower parts of the image of the subject sensed are detected based upon the camera inclination. In a case where the subject is a person, the face image often will be in the upper part of the image of the subject and therefore the upper part of the image of the subject is set as the face-image detection area. Since the face-image detection area is a partial area rather than the entire image of the subject, the time required for detection processing can be shortened.

Figure 9A:
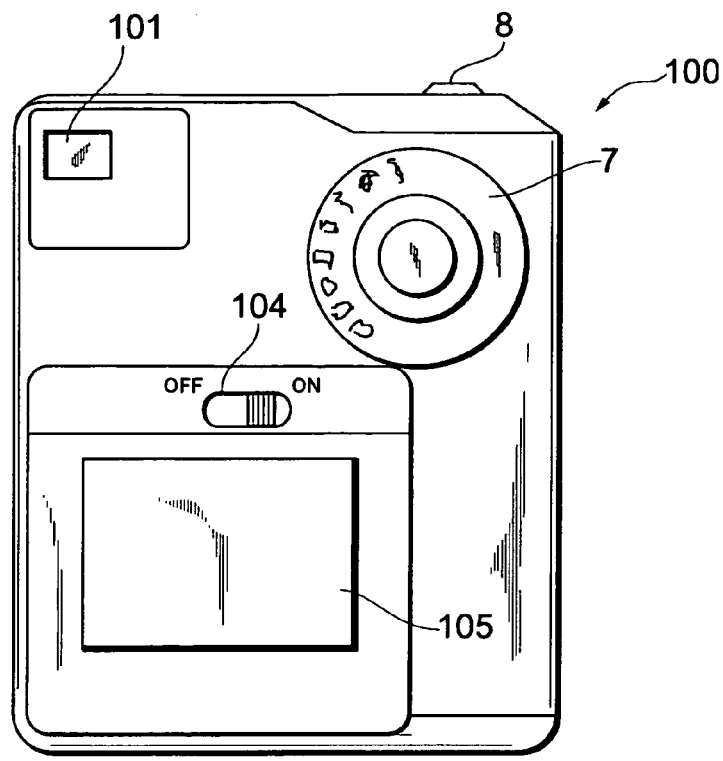
FIGS. 9A and 10A are diagrams illustrating the back side of a digital still camera.

FIG. 9A is a back view of a digital still camera 100.

The digital still camera 100 is provided with a shutter button 8 which is on the top of the camera on the right side thereof when the camera is in the upright attitude. The digital still camera 100 is further provided with an optical viewfinder 101 which is at the upper-left corner of the camera back, and with a display screen 105 of a liquid crystal display device which is at the lower part of the camera back, when the camera is in the upright attitude. A power button 104 is provided above the display screen 105.

Figure 9B:
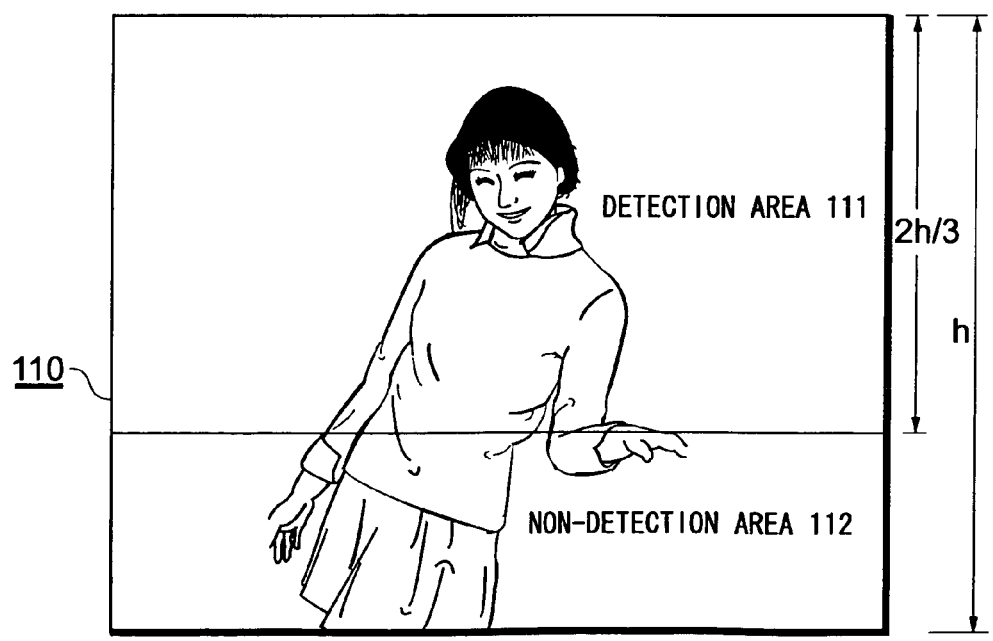
FIGS. 9B and 10B illustrate examples of images of a subject according to a fourth embodiment.

FIG. 9B is an example of the image of a subject obtained by sensing the image of the subject with the digital still camera 100 in the upright attitude in the manner shown in FIG. 9A.

If the image of a subject is sensed with the digital still camera 100 in the upright attitude, an subject image 110 obtained is in the landscape orientation. If the subject is a person, then the face often will be located in the upper part of the imaging zone. If the subject image 110 in the landscape orientation is obtained, therefore, then, assuming that the height of the subject image 110 is h, the upper 2h/3 of the subject image 110 will be a face-image detection area 111 and the lower h/3 of the subject image 110 will be a face-image non-detection area 112. Since face-image detection processing is executed in the area at the upper part of the subject image 110 and not in the entirety of the subject image 110, processing time can be curtailed.

Figure 10A:
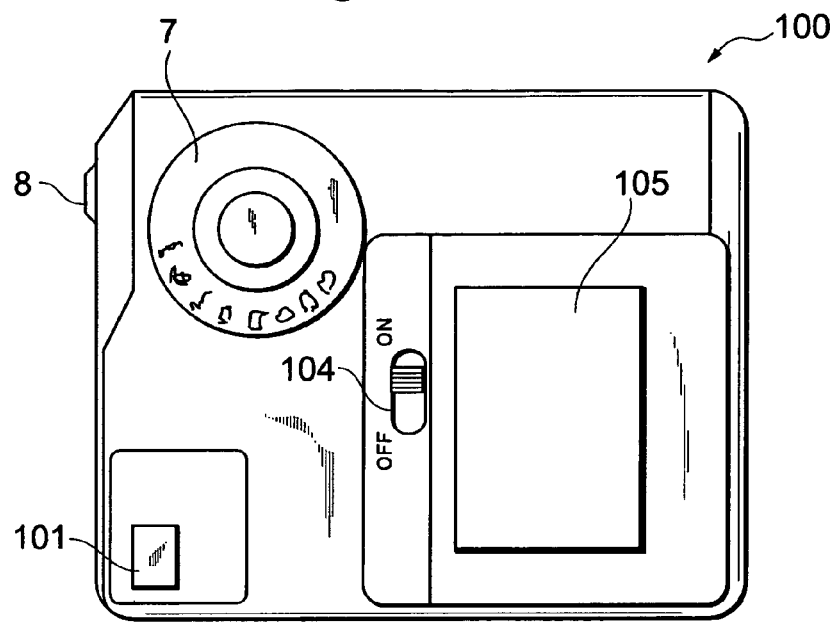

FIG. 10A is a back view of a digital still camera 100. Here components identical with those of FIG. 9A are designated by like reference characters and need not be described again.

Here the digital still camera 100 is in a state in which the camera has been rotated counter-clockwise 90° from the upright attitude.

Figure 10B:
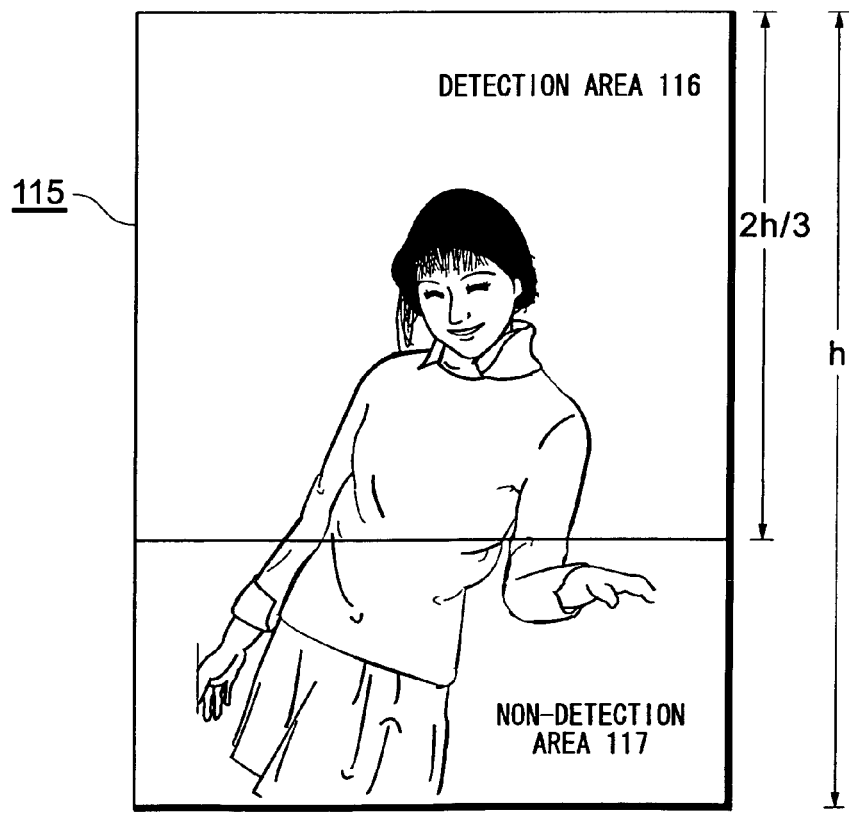

FIG. 10B is an example of the image of a subject obtained by sensing the image of the subject with the digital still camera 100 rotated counter-clockwise 90° from the upright attitude.

A subject image 115 is in the portrait orientation. If the subject is a person, then the face often will be located in the upper part of the imaging zone in this case as well. If the subject image 115 in the portrait orientation is obtained, therefore, then, assuming that the height of the subject image 115 is h, the upper 2h/3 of the subject image 115 will be a face-image detection area 116 and the lower h/3 of the subject image 110 will be a face-image non-detection area 116. Since face-image detection processing is executed in the detection area 116 that is small in comparison with the area of the subject image 115, processing time can be curtailed.

Figure 11:
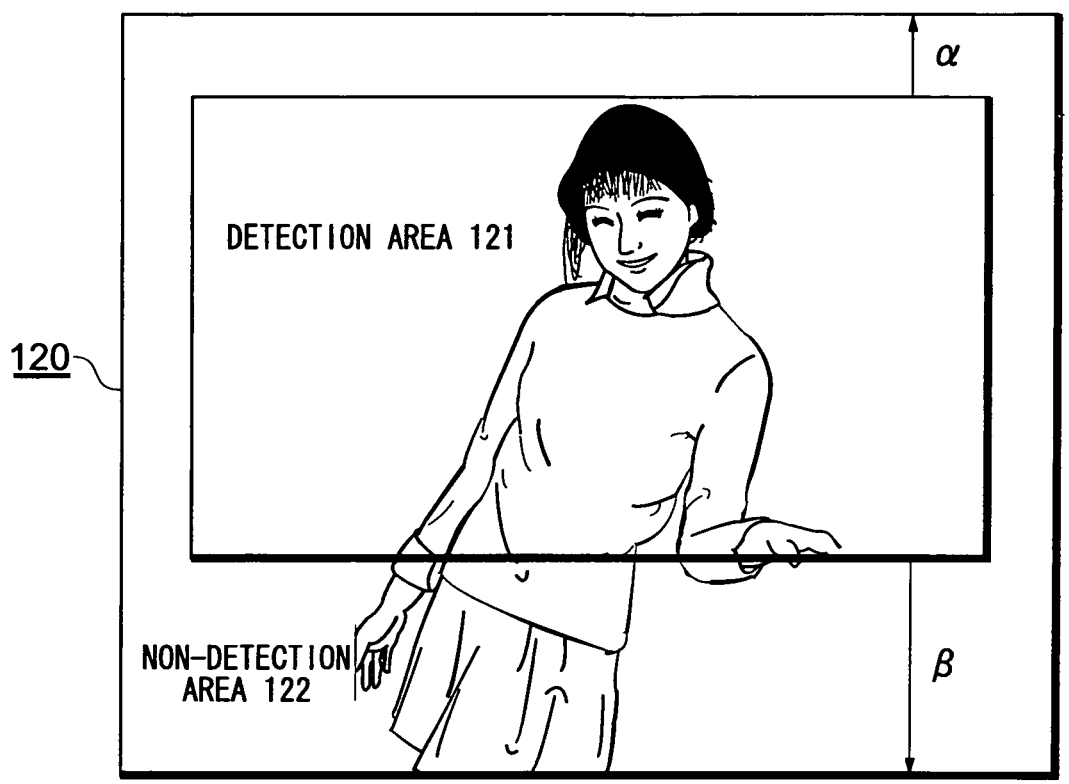
FIG. 11 illustrates an example of the image of a subject according to the fourth embodiment.

FIG. 11 is an example of the image of a subject obtained by sensing the image of the subject with the digital still camera in the upright attitude.

An area contained in a subject image 120 is stipulated as a detection area 121. The detection area 121 is rectangular. If we let α represent the distance from the upper edge of the detection area 121 to the upper edge of the subject image 120 and let β represent the distance from the lower edge of the detection area 121 to the lower edge of the subject image 120, then the relationship α<β will hold. It may be so arranged that the detection area 121 is stipulated as a face-image detection area. Further, a rectangular area in which the center of gravity falls within an area in the upper half of the image of the subject may be adopted as the face-image detection area.

Figure 12:
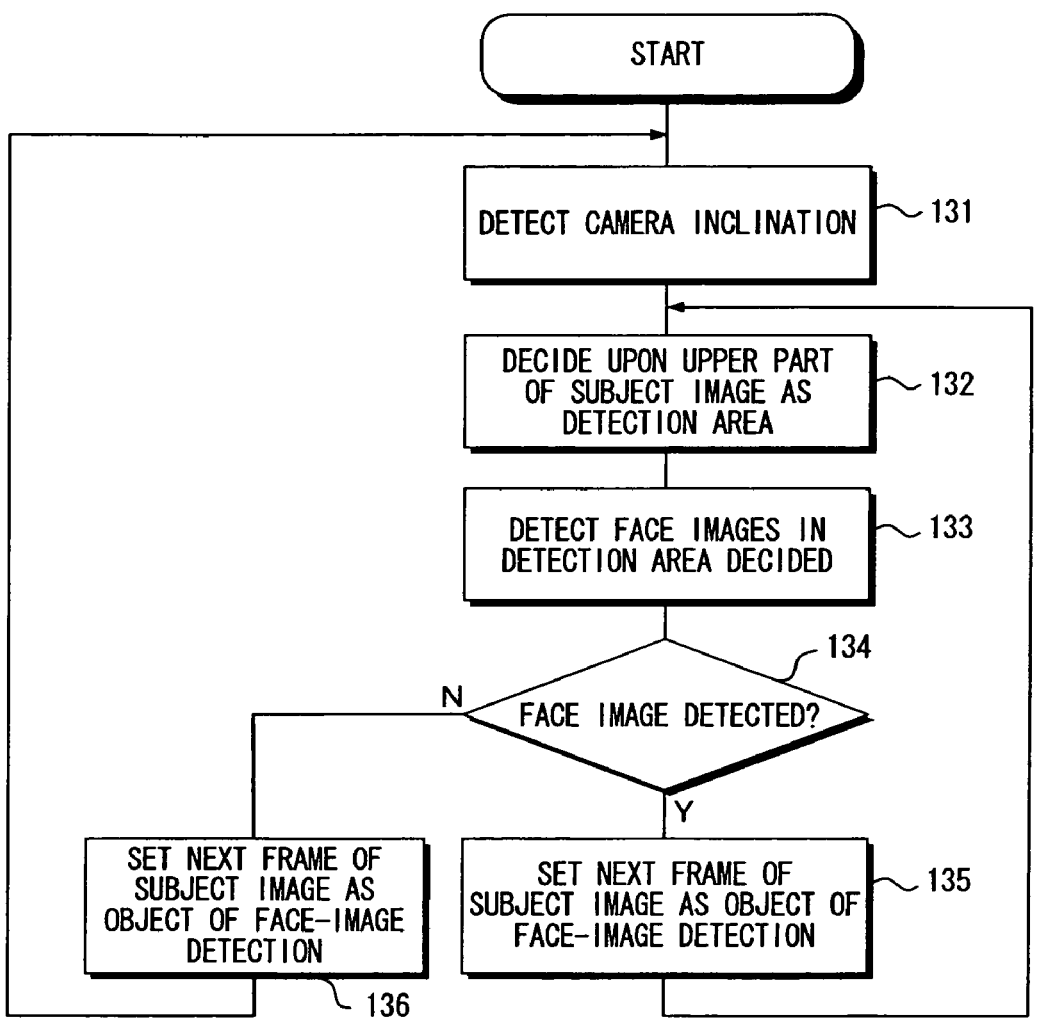
FIGS. 12 and 13 are flowcharts illustrating processing for detecting a face image according to fourth and fifth embodiments, respectively.

FIG. 12 is a flowchart illustrating processing for detecting a face image.

The inclination of the digital still camera is detected (step 131) and the upper part of the subject image obtained by image sensing is decided upon as the face-image detection area (step 132). If the image of the subject is sensed, then face-image detection processing is executed with regard to the image within this detection area (step 133).

If a face image is detected ("YES" at step 134), then the next frame of the image of the subject is set as the target of face-image detection (step 135) and the upper part of the subject image is decided upon again as the detection area (step 132). If a face image is not detected ("NO" at step 134), then the next frame of the subject image is set as the target of face-image detection (step 136), camera inclination is detected again (step 131) and the upper part of the subject image ascertained from the detected inclination is decided upon the face-image detection area (step 132). Thus, face-image detection processing is executed with regard to an area in which there is a high probability that a face image is present.

Figure 13:
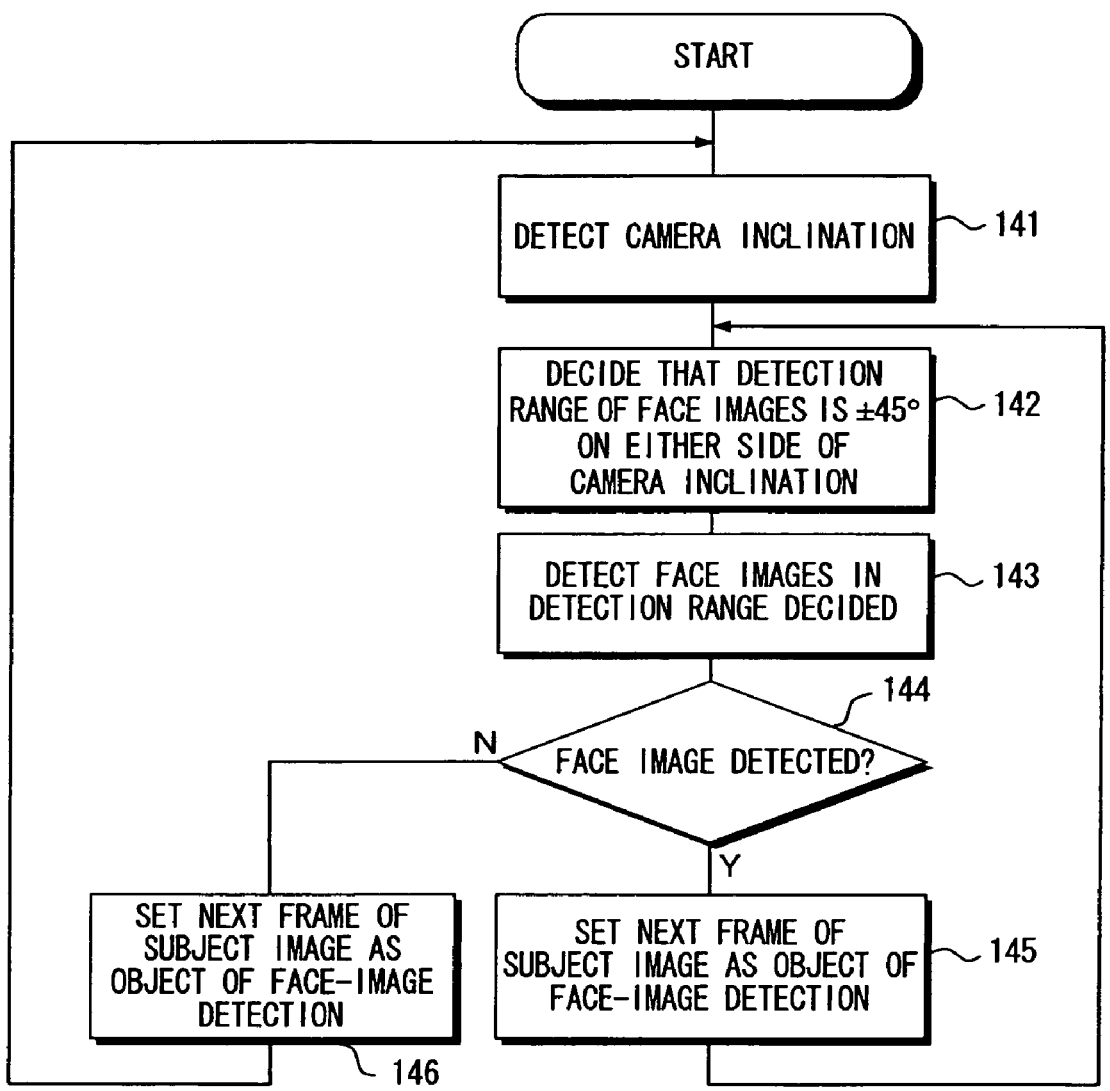

FIG. 13 is a flowchart illustrating face-image detection processing according to a fifth embodiment of the present invention.

The inclination of the digital still camera is detected in this embodiment as well (step 141). The detection range of inclined face images is decided upon as a range of 45° on either side of camera inclination (step 142). For example, if the camera is in the upright attitude, then camera inclination is 0° and face images having an inclination of 315° to 45° are detected (see FIG. 2). Face images having an inclination within the detection range decided are detected (step 143). Since face images having inclinations outside the detection range do not undergo detection, detection time is shortened.

If a face image is detected ("YES" at step 144), then the next frame of the image of the subject is set as the target of face-image detection (step 145) and the detection range is decided upon again as a range of 45° on either side of camera inclination detected (step 142). If a face image is not detected ("NO" at step 144), then the next frame of the subject image is set as the target of face-image detection (step 146), camera inclination is detected again (step 141) and the detection range is decided upon as a range of 45° on either side of camera inclination detected (step 142).

In the embodiments set forth above, a face image is mentioned as an example of a target image to be detected. However, the target image is not limited to a face image and other images, such as the image of an eye, may be adopted as a target image to be detected.

As many apparently widely different embodiments of the present invention can be made without departing from the spirit and scope thereof, it is to be understood that the invention is not limited to the specific embodiments thereof except as defined in the appended claims.

What is claimed is:

1. A target-image search apparatus comprising: a first target region detecting device for detecting a plurality of face regions from a first subject image among a plurality of frames of subject images obtained by sensing the image of a subject successively, wherein each of the face regions include a face; a coordinate detecting device for detecting a minimum value and a maximum value of each of X-coordinate positions and Y-coordinate positions of the plurality of face regions detected by said first target region detecting device; and a second target region detecting device for detecting the face regions in a first area, decided based upon the minimum values and maximum values detected by said coordinate detecting device, in a second subject image different from the first subject image among the plurality of frames of subject images, wherein the first area is larger than a second area that encloses the detected plurality of face regions and the first area is smaller than the second subject image.

2. A method of controlling a target-image search apparatus, comprising the steps of: detecting a plurality of face regions from a first subject image among a plurality of frames of subject images obtained by sensing the image of a subject successively; detecting a minimum value and a maximum value of each of X-coordinate positions and Y-coordinate positions of the plurality of face regions detected; and detecting the face regions in a first area decided based upon the minimum value and maximum value detected, in a second subject image different from the first subject image among the plurality of frames of subject images; wherein the first area is larger than a second area that encloses the detected plurality of face regions and the first area is smaller than the second subject image.

3. The apparatus according to claim 1, wherein said second target region detecting device detects the face region in the second subject image, if the face region is not detected within the first area.

4. A digital camera having the apparatus according to claim 1.

* * * * *